United States Patent [19]
Fisher, Jr.

[11] Patent Number: 4,780,051
[45] Date of Patent: Oct. 25, 1988

[54] HYDRAULIC TURBINE AERATION APPARATUS

[75] Inventor: Richard K. Fisher, Jr., Jacobus, Pa.

[73] Assignee: Voith Hydro, Inc., York, Pa.

[21] Appl. No.: 924,172

[22] Filed: Oct. 24, 1986

Related U.S. Application Data

[63] Continuation of Ser. No. 737,802, May 23, 1985, abandoned.

[51] Int. Cl.$^4$ ............................................. F04D 31/00
[52] U.S. Cl. .................................. 415/116; 416/90 R; 416/231 R; 261/87
[58] Field of Search ......... 415/115, 116, 117, DIG. 1; 416/90, 231 R; 261/87, 88

[56] References Cited

U.S. PATENT DOCUMENTS

| | | | |
|---|---|---|---|
| 1,579,355 | 4/1926 | Greenawalt | 261/87 |
| 1,925,777 | 9/1933 | Sperling | 261/87 |
| 1,942,995 | 1/1934 | Biggs | 415/116 |
| 2,668,079 | 2/1954 | Menegus et al. | 261/88 |
| 2,772,863 | 12/1956 | Harney et al. | 415/116 |
| 2,803,428 | 8/1957 | Garnett | 415/116 |
| 3,123,651 | 3/1964 | Gross et al. | 261/87 |
| 3,132,839 | 5/1964 | Haekal | 415/115 |
| 3,305,215 | 2/1967 | Swiecicki et al. | 415/117 |
| 3,862,747 | 1/1975 | Richter | 416/90 |
| 4,169,047 | 9/1979 | Wilson | 261/87 |
| 4,188,287 | 2/1980 | Faulkner et al. | 261/87 |
| 4,371,480 | 2/1983 | Vos | 416/90 R |

FOREIGN PATENT DOCUMENTS 2404297  8/1974  Fed. Rep. of Germany ...... 415/116

*Primary Examiner*—Robert E. Garrett
*Assistant Examiner*—John T. Kwon
*Attorney, Agent, or Firm*—Ostrolenk, Faber, Gerb & Soffen

[57] ABSTRACT

An apparatus for aerating water discharging from a hydraulic turbine comprises an air distribution apparatus secured to the trailing edges of a turbine runner. The air distribution apparatus comprises a manifold which contains a bounded air channel extending the length of the runner blade trailing edge. A plurality of holes are formed along the mainfold extending between the channel and the turbine interior. The channel is in air flow communication with a source of oxygen.

2 Claims, 1 Drawing Sheet

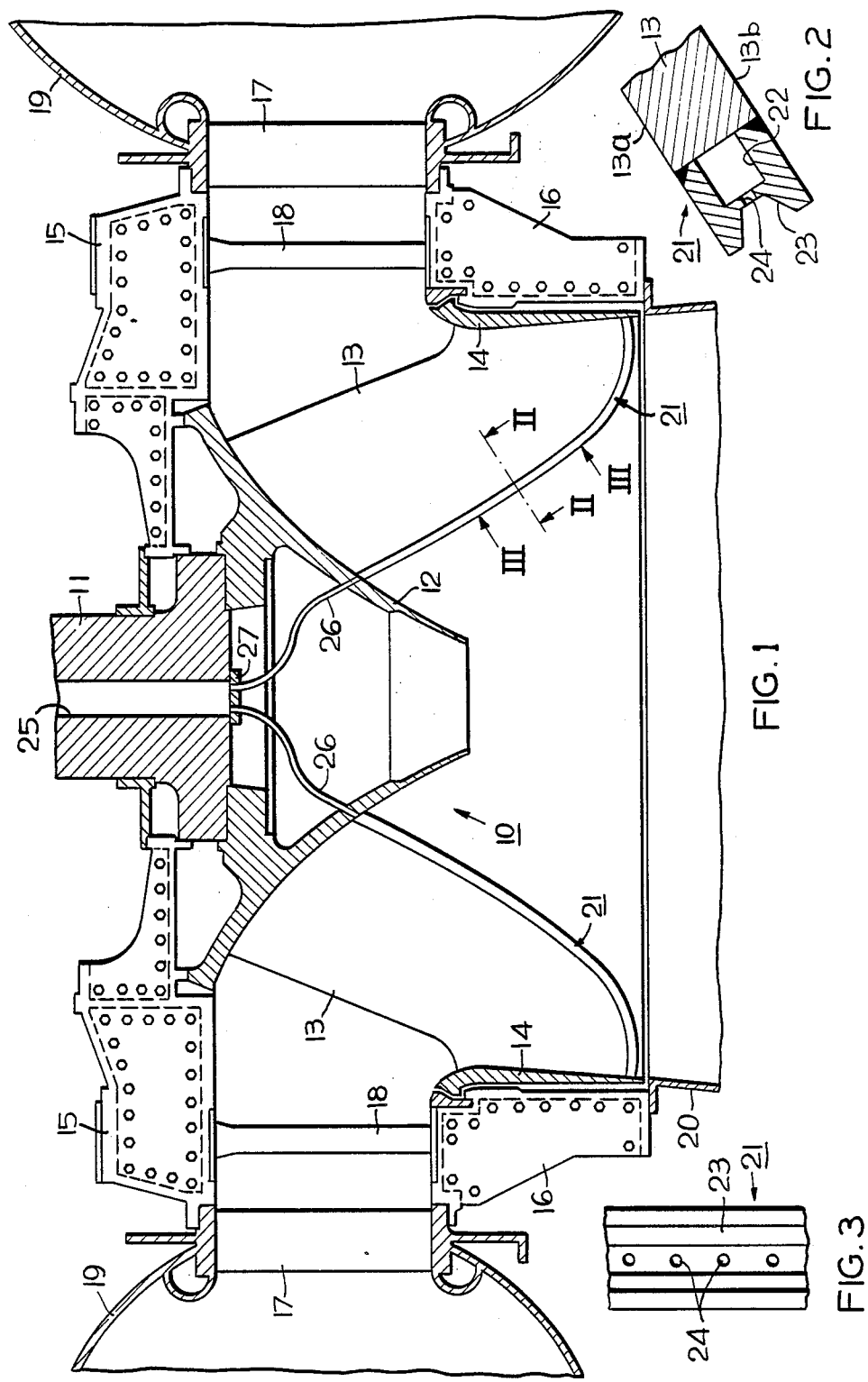

HYDRAULIC TURBINE AERATION APPARATUS

This application is a continuation of application Ser. NO. 737,802 filed May 23, 1985 now abandoned.

BACKROUND OF THE INVENTION

1. Field of the Invention

This invention pertains to hydraulic turbine installations and more particularly to hydraulic turbine installations with means for providing aeration of water discharging from the turbine.

2. Description of the Prior Art

Partly in response to the increased cost and political uncertainties which arise from obtaining energy from oil, development of hydraulic turbine installations has increased. Hydroelectric power and its development was also considered more socially acceptable since such installations were generally free from many of the adverse environmental influences which are normally associated with the combustion of fossil fuel. However, hydroelectric power installations do have environmental impacts. One potentially adverse impact associated with hydroelectric installations is a reduction in the level of dissolved oxygen in the water discharged from the turbine. This is due to the turbine drawing in water from the bottom of an upstream lake or reservoir which has a low dissolved oxygen level. Significant reductions in the dissolved oxygen level can prove hazardous to fish and marine plant life. Accordingly, hydroelectric installations are being considered point source pollution problems.

A desire to enhance the environmental impact of hydraulic turbine installations has led to substantial studies and efforts to provide apparatus to aerate water discharged from a hydraulic turbine. Generally, the efforts are aimed at injecting oxygen or air into the discharged water to increase its dissolved oxygen content.

Apparatus for aerating water or otherwise injecting a gas into a liquid are not new. For example, U.S. Pat. No. 3,108,146 to Gross teaches an apparatus for aerating a large body of water. The aeration device of Gross includes a motor driven propeller having air injection holes on the back surfaces of the propeller blade. The propeller drives air into the water to produce a column of aerated water which is transported through a large body of surface water. The water to be aerated (i.e., the surface water) is not effectively treated until the column travels a sufficient distance for the entrained air to explode. This suggests there is little dissolution of oxygen in water caused by the injecting propeller.

U.S. Pat. No. 4,371,480 to Vos teaches an apparatus consisting of a propeller for distributing a gas in a liquid. The propeller blades have a flat lower camber. The upper camber is generally flat from the leading edge to a hollow portion housing a cavity. Perforations in the hollow portion permit passage of air from the cavity to surround water forward of the blade trailing edge. To be operable, the Vos propeller must be rotated at cavitation producing velocities. While Vos demonstrates an increase in dissolved oxygen content, Vos would not appear applicable to hydraulic turbine installations. That is, it would not appear practical to provide an apparatus such as taught by Vos in a turbine installation. Certainly, it would not be feasible to modify turbine runner blades to correspond to the blades of Vos. To modify turbine runner blades to have the salient geometric features of Vos would overly impair the hydraulic performance of the turbine. Finally, it would not be desirable to operate a hydraulic turbine at cavitation producing velocities with a goal of producing cavitation and blade design to encourage cavitations.

Some prior art aerating apparatus are not sufficiently effective or practical for turbine installations. The hydraulic turbine art has been actively seeking apparatus which would be effective in the peculiar environment of hydraulic turbines to increase the level of dissolved oxygen within the turbine discharge water without creating significant performance penalties (i.e., drops in efficiency or power). An example of such a study is "LOX Dissolved Oxygen Mitigation System for Hydro Project" by Marsh et al (paper presented to ASCE Boston Spec Conference, Hydraulics Division, August 1983). Also, describing the current ,state of the art is "More on Turbine Venting", Impart, Volume 6, No. 7, Pages 8-10 and "Dissolved Oxygen Improvement by Hydroelectric Turbine Aspiration" Journal of the Power Division, page 139, May 1973 and "Improving Reservoir Releases", Tennessee Valley Authority, Office of Natural Resources, Division of Water Resources, December 1981 and "Draft Tube Aeration of Hydroelectric Discharges" by Raney (paper presented to Federal Interagency Steering Committee on Reaeration Research, March 1982). The above referenced papers present the prior art attempts for increasing the dissolved oxygen content of water discharged from a hydraulic turbine installation. The described methods and apparatus teach a technique for injecting air or oxygen into the low pressure region of the draft tube immediately downstream of the turbine runner. The air or oxygen is injected through the draft tube wall or through baffle plates positioned on the hub of the turbine runner both resulting in undesirable performance losses.

While the aforementioned prior art techniques of aerating turbine discharge water provide for an increase in dissolved oxygen content of the water, they present certain drawbacks. The prior art methods provided too much air in large bubbles which result in significant performance deterioration. Power reduction from one to three percent can result. Also, the large bubbles are not easily dissolved in the water. Finally, in the prior art methods, the dissolved oxygen or air is concentrated in the region of injection and not uniformly distributed throughout the discharge water.

OBJECTS AND SUMMARY OF THE PRESENT INVENTION

It is an object of the present invention to provide an apparatus for aerating water discharging from a hydraulic turbine installation.

It is a further object of the present invention to provide an apparatus for aerating turbine discharged water with small oxygen containing bubbles more uniformly dispersed within the draft tube of the hydraulic turbine.

It is a further object of the present invention to provide a hydraulic turbine aeration apparatus which dissolves oxygen within the discharge water with minimum impact on turbine performance.

According to a preferred embodiment of the present invention, a hydraulic turbine is provided comprising a runner having a plurality of turbine blades. The turbine blades present a leading edge and a trailing edge separated by a water directing surface. The trailing edge is provided with an air distribution apparatus secured to or near the trailing edge. The apparatus consists of a manifold secured to the trailing edge or integral with the blading and extending the length of the trailing edge from the runner hub to the runner shroud. An air channel is formed within the manifold and extends its length. A plurality of air dispersing holes are formed through the manifold communicating with the channel to permit passage of oxygen or air from the channel through the holes into water flowing past the trailing edge. The channel is connected in gas flow communication with atmospheric or pressurized air by means of supply conduits.

BRIEF DESCRIPTION OF THE DRAWINGS

FIG. 1 is a view in elevation of a hydraulic turbine having an aeration apparatus according to the present invention;

FIG. 2 is a view taken along line II—II of FIG. 1; and

FIG. 3 is a view taken along line III—III of FIG. 1.

DESCRIPTION OF THE PREFERRED EMBODIMENT

Referring to FIG. 1, a hydraulic turbine is shown having an aeration device according to the present invention. The turbine comprises a runner 10 secured to a rotary shaft 11 for rotation therewith. As shown in FIG. 1, the turbine is a Francis turbine with a vertical shaft. It will be appreciated from the description which follows that the present invention is also applicable to other turbines with other inclinations and is not limited to the embodiment of a vertical Francis turbine.

The turbine runner 10 includes a hub 12 secured to the shaft 11 and a plurality of runner blades 13 extending from the hub 12 and terminating at an enclosing shroud 14. The turbine includes a stationary head cover 15 and bottom ring 16 spaced apart by a plurality of stationary stay vanes 17. The head cover 15 and bottom ring 16 support a plurality of pivotally adjustable wicket gates 18. A spiral casing 19 surrounds the stay vanes 17 and is connected by a penstock (not shown) to an upper elevation reservoir. A draft tube 20 connects the turbine with a lower elevation reservoir. The penstock, spiral casing 19, head cover 15, bottom ring 16 and draft tube defines a water passageway for the turbine installation.

The aeration device of the present invention comprises an air distribution manifold 21 secured to the trailing edge of the runner blades 13. While the manifold 21 could be secured to the trailing edge of any of the hydrofoils of the turbine (e.g., the wicket gates 18 or stay vanes 17), the runner blades 13 are preferred for the reasons that will follow.

As is more clearly shown in FIGS. 2 and 3, the manifold 21 has a first groove or channel 22 formed along its entire length and a V-shaped groove 23 formed along its length on a side of the manifold opposite the channel 22. A plurality of holes 24 are provided in the manifold 21 extending between the channel 22 and the V-shaped groove 23. The manifold is welded to the trailing edge of the blade with the channel being completely bounded by the manifold body, the trailing edge of the blade, the hub and the shroud. The channel only communicates with the interior of the draft tube by means of the holes 24 extending between the channel 22 and the V-shaped groove 23. Also, as shown in FIG. 2, the manifold extends the water directing surfaces 13a and 13b of the blade 13 without modifying the camber of either.

The turbine shaft 11 is provided with an axially extending bore 25 which communicates through any suitable means with atmospheric air or a pressurized source of air or oxygen. Supply tubes 26 within the hub 12 extend between each of the channels 22 and the bore 25 connecting the two in gas flow communication. A cap 27 covers the bore preventing water flow in the bore 25.

In operation of the apparatus, a low pressure region develops in the downstream side of the hydrofoils such as the blade 13. This results in a pressure differential with the source of oxygen drawing the gas through the bore 25 and tubes 26 and into the channel 22. The pressure in the draft tube is lowest as at the trailing edge of the blade. The V-shaped groove 23 results in even lower pressure at the holes 24 resulting in oxygen flowing from the channel into the draft tube. The size of the gas bubbles can be readily controlled by controlling the size of holes 24 to prevent the formation of large bubbles and insure oxygen dissolving into the water.

Providing the manifold on the trailing edge of the blade provides an additional benefit in that the injected gas is distributed uniformly over the cross section of the draft tube. Perhaps most importantly, the high level of turbulence in the Von Karman vortex sheets flowing down from the rotating blades along surfaces 13a and 13b adds mixing and dispersing not previously utilized in the art with resultant enhanced dispersion of the injected gas.

As can be seen from the foregoing, the apparatus of the present invention distributes oxygen or air across the cross section of the draft tube in a curtain of small bubbles to promote the dissolution of oxygen within the water and with a minimum of performance deterioration otherwise found in the art. Additionally, the present invention, unlike any of the apparatus of the cited art, is particularly suited for retrofitting existing turbine installations.

From the foregoing detailed description of the present invention, it has been shown how the objects of the present invention have been attained in a preferred manner. However, modifications and equivalents of the disclosed concepts, such as readily occur to those skilled in the art, are intended to be included in the scope of this invention. For example, in the embodiment shown, the manifold 21 is shown as a separate item secured to the trailing edge of the blade. However, the manifold could be formed integral with the blade by forming the channel 22 directly into the trailing edge and covering the channel with a cover plate having a plurality of holes formed therethrough to communicate with the channel. Thus, the scope of the invention is intended to be limited only by the scope of the claims such as are, or may hereafter be, appended hereto.

The embodiments of the invention in which an exclusive property or privilege is claimed are defined as follows:

1. A hydraulic turbine installation comprising:
   means for defining a water passageway for containing turbine components and extending from an upper elevation source of water to a lower elevation discharge; a draft tube; a turbine runner disposed in the draft tube and having a plurality of blades disposed within the passageway and each said blade comprising a hydrofoil having a leading edge and a trailing edge separated by a water directing surface with said turbine runner positioned within said passageway for water to impinge upon said leading edge and flow along said surface and past said trailing edge as water flows through said passageway from said upper elevation reservoir; means for distributing a gas into water flowing past said trailing edge; means for supplying an oxygen containing gas to said distribution means; said distribution means comprises a manifold extending along said trailing edge and having a bounded channel therethrough in gas flow communication with said means for supplying an oxygen containing gas; said manifold is provided with a V-shaped groove along its length and opening away from the trailing edge of said blade and in communication with said water passageway; said manifold being provided with exterior surfaces aligned with water directing surfaces of said blades to provide a continuation of said water directing surfaces, said exterior surfaces having respective surface curvatures which are matched to surface curvatures associated with said water directing surfaces of said blades; and a plurality of orifices formed through said manifold and extending between said channel and the apex of said V-shaped groove.

2. A hydraulic turbine installation according to claim 1, wherein said manifold is formed integral with said blades and including means for covering said channel and to define said plurality of orifices which communicate with said channel.

* * * * *